United States Patent
Hazlehurst et al.

(10) Patent No.: US 7,606,752 B2
(45) Date of Patent: Oct. 20, 2009

(54) HOST EXCHANGE IN BILL PAYING SERVICES

(75) Inventors: Peter Alexander Hazlehurst, Foster City, CA (US); Cindy Alvarez, San Francisco, CA (US)

(73) Assignee: Yodlee Inc., Redwood City, CA (US)

( * ) Notice: Subject to any disclaimer, the term of this patent is extended or adjusted under 35 U.S.C. 154(b) by 0 days.

(21) Appl. No.: 11/851,131

(22) Filed: Sep. 6, 2007

(65) Prior Publication Data

US 2008/0065520 A1   Mar. 13, 2008

Related U.S. Application Data

(60) Provisional application No. 60/843,450, filed on Sep. 7, 2006.

(51) Int. Cl.
*G06Q 40/00* (2006.01)
(52) U.S. Cl. .......................................... 705/35; 705/40
(58) Field of Classification Search .................... 705/35
See application file for complete search history.

(56) References Cited

U.S. PATENT DOCUMENTS

2003/0225688 A1 * 12/2003 Dobbins ...................... 705/39
2006/0116949 A1 *  6/2006 Wehunt et al. ............... 705/35

OTHER PUBLICATIONS

Account Aggregation: Independent Study University of Rhode Island, 2002.*

* cited by examiner

*Primary Examiner*—Thomas A Dixon
*Assistant Examiner*—William E Rankins
(74) *Attorney, Agent, or Firm*—Donald R. Boys; Central Coast Patent Agency, Inc.

(57) ABSTRACT

An account exchange system is provided by a data aggregation service enabled for gathering data for a subscriber from a data repository of a first financial institution, using account exchange software operating on a server coupled to the data aggregation service. Initiated by a subscriber the account exchange software causes an account to be terminated at the first financial institution and a new account to be opened at a second financial institution, using data from the first financial institution, and processing the data to be compatible with data requirements at the second financial institution.

22 Claims, 4 Drawing Sheets

HOST EXCHANGE IN BILL PAYING SERVICES

CROSS-REFERENCE TO RELATED APPLICATIONS

The present invention claims priority to a U.S. provisional patent application Ser. No. 60/843,450 entitled HOST EXCHANGE IN BILL PAYING SERVICES, filed on Sep. 7, 2006, disclosure of which is included herein at least by reference.

BACKGROUND OF THE INVENTION

1. Field of the Invention

The present invention is in the area of bill payment services, and pertains more particularly to processes for subscribers exchanging hosts in such services.

2. Discussion of the State of the Art

It is well known that financial institutions, such as banks in particular, provide customers with bill payment services. In a typical implementation, the bank provides interactive interfaces through web pages accessible through a customer's Internet browser for the customer to list payees and to schedule payments. A customer, for example, may receive bills on a regular basis from the local electric utility, the telephone company, an Internet service provider, a cable company for TV cable service, credit card companies and from many other product or service providers. In the bill paying service of a typical bank the user may enter contact and mailing information for the billing parties, and may schedule payments to be made at a future date. This information is saved at the host, and acted upon as scheduled, with the bank issuing payment (typically a check) on behalf of the user, and the user's account is debited when the payment is made.

As might be expected, not all customers of a bank remain customers of that bank forever. Banking is a competitive business, and many people change banks on occasion for whatever reason. When a customer quits one bank for another, and that customer has an active bill paying account with the bank, the customer has to clear that account, perhaps paying some bills early, or canceling payments scheduled in the service, before finally closing the account at the bank. Further, the same customer, opening an account at another bank and desiring to still have a bill-paying service, has to redo the somewhat tedious process of entering all of the usual payees, and rescheduling payments for outstanding bills.

What is clearly needed is a system and method for seamlessly accessing bill payment data for a customer at one bank, and for transferring all of that information to another bank as a part of the process of opening a new account.

SUMMARY OF THE INVENTION

In an embodiment of the present invention an account exchange system is provided, comprising a computerized data aggregation service enabled for gathering data for a subscriber from a data repository of a first financial institution and account exchange software operating on a server coupled to the data aggregation service. Initiated by the subscriber, the account exchange software causes an account to be terminated at the first financial institution and a new account to be opened at a second financial institution, using data from the first financial institution, and processing the data to be compatible with data requirements at the second financial institution.

In one embodiment bill payment services are configured for the subscriber at the second financial institution using data from a bill payment service at the first financial institution. Also in one embodiment data is accessed and transferred over the Internet network. The account may be one of a checking or a savings account, and the financial institutions may be commercial banks.

Data in various embodiments may include information about payees registered by the subscriber at the first financial institution, and subscriber data at the payee site including though not limited to account number, remittance address, and user authentication data. The data may also include payment schedules for each payee whether recurring payments or one-time payments. The data may also include data defining e-bills presented by any of the payees to the customer, the data including form structure and format and data describing presentment protocols for any of the payees of the customer. Also in some embodiments the data includes data describing the payment histories of the customer relative to any or all of the payees of the customer.

In some cases at least one of the financial institutions may discovered by the system through tangential services offered by an entity hosting the system. There may also be an interactive solicitation module that offers the subscriber help with the task of switching service accounts.

In another aspect of the invention a method for account transition is provided, comprising steps of (a) gathering data from a first financial institution by a data aggregation service for a subscriber of the data aggregation service who is also a customer of the first financial institution; and (b) initiated by the subscriber, causing, by account exchange software operating on a server coupled to the data aggregation service, a new account to be opened at a second financial institution, using data from the first financial institution, the data processed by the software to be compatible with data requirements at the second financial institution.

In one embodiment of the method bill payment services are configured for the subscriber at the second financial institution using data from a bill payment service at the first financial institution. Also in one embodiment data is accessed and transferred over the Internet network. Accounts may include checking or savings accounts. The financial institutions may be commercial banks.

In some embodiments the data includes information about payees registered by the subscriber at the first financial institution, and the payee information may include subscriber data at the payee site including though not limited to account number, remittance address, and user authentication data. Also in some embodiments the data may include payment schedules for each payee whether recurring payments or one-time payments.

In still other embodiments the data may include data defining e-bills presented by any of the payees to the customer, the data including form structure and format. The data may also include data describing presentment protocols for any of the payees of the customer. The data may also comprise data describing the payment histories of the customer relative to any or all of the payees of the customer.

In one embodiment at least one of the financial institutions is discovered by the system through tangential services offered by an entity hosting the system, and there may also be an interactive solicitation module that offers the subscriber help with the task of switching service accounts.

BRIEF DESCRIPTION OF THE DRAWING FIGURES

DETAILED DESCRIPTION

It is well known that there are enterprises that provide information collection, aggregation and normalization services for subscribers. One such enterprise is Yodlee.com, a California corporation to whom the inventors either have assigned, or have an obligation to assign the present invention.

Figure 1:
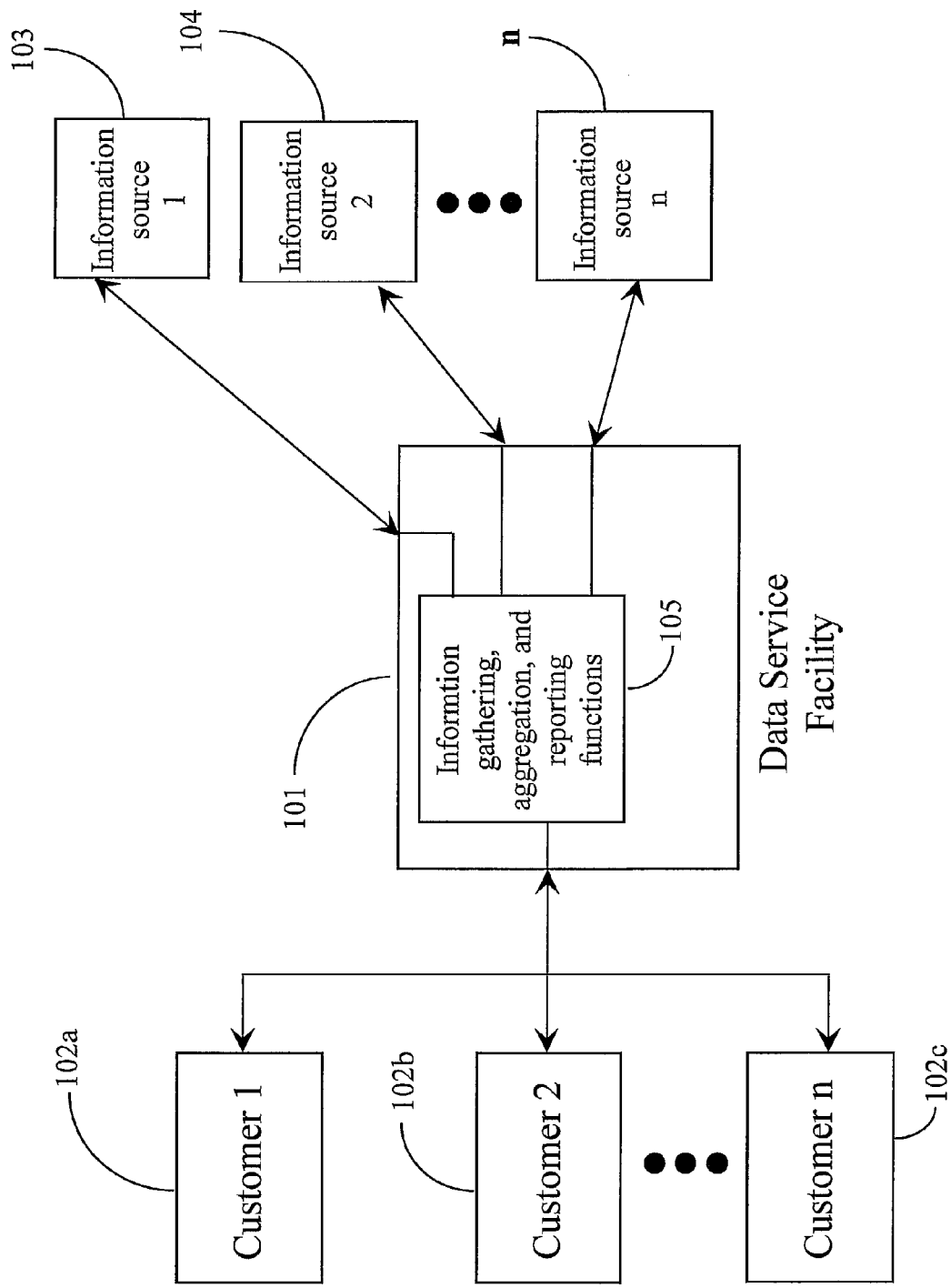
FIG. 1 is a block diagram illustrating a gathering and aggregation service known to the inventors.

FIG. 1 is a block diagram illustrating an Internet-connected information collection, aggregation, and transmission facility 101, interacting over the Internet network with customer stations 102a through 102c, labeled as customers 1 through n. These customers have authorized the facility to collect information from various information sources, labeled Information source 1 through n, and represented in FIG. 1 by element numbers 103, 104, through n. In this example information source 103 is a bank where customer 102 maintains a checking account, and as a part of the services of bank 103, customer 102 also uses a bill-paying service of bank 103. Customers 1-n are typically operating as computer stations connected to a network, which may be the Internet network in one embodiment. Customers 1-n may also be operating from other appliances, such as a hand-held computer appliance like a cellular telephone or personal digital assistant that has network access and navigation capabilities and a display function.

One of the services provided by facility 101 in this example is periodic access of customer 102's account balance, pending transactions, and the like for the customer's checking account at bank 103, which may be aggregated with other information from other information sources, such as accounts kept in other banks, and may be normalized and provided periodically to customer 102 as a summarized report. In some cases facility 101 may provide integrated bill paying services for customer 102, but in the present example the customer manages the bill paying functions with bank 103 entirely separately. Block 105 in FIG. 1 represents the functionality for the data collection, aggregation and reporting features described, including software and hardware.

In a typical implementation customer 102 logs in to facility 101, typically at a network server using one ID, such as a unique user name and password pair, and has previously provided, in a set up operation, log-in ID information to enterprise 101 for individual ones of information sources 103-n, at which customer 102 is also a customer. The customer therefore has only one user-name password pair to remember. Facility 101 therefore has access to the customer's account or accounts at the bank.

Figure 2:
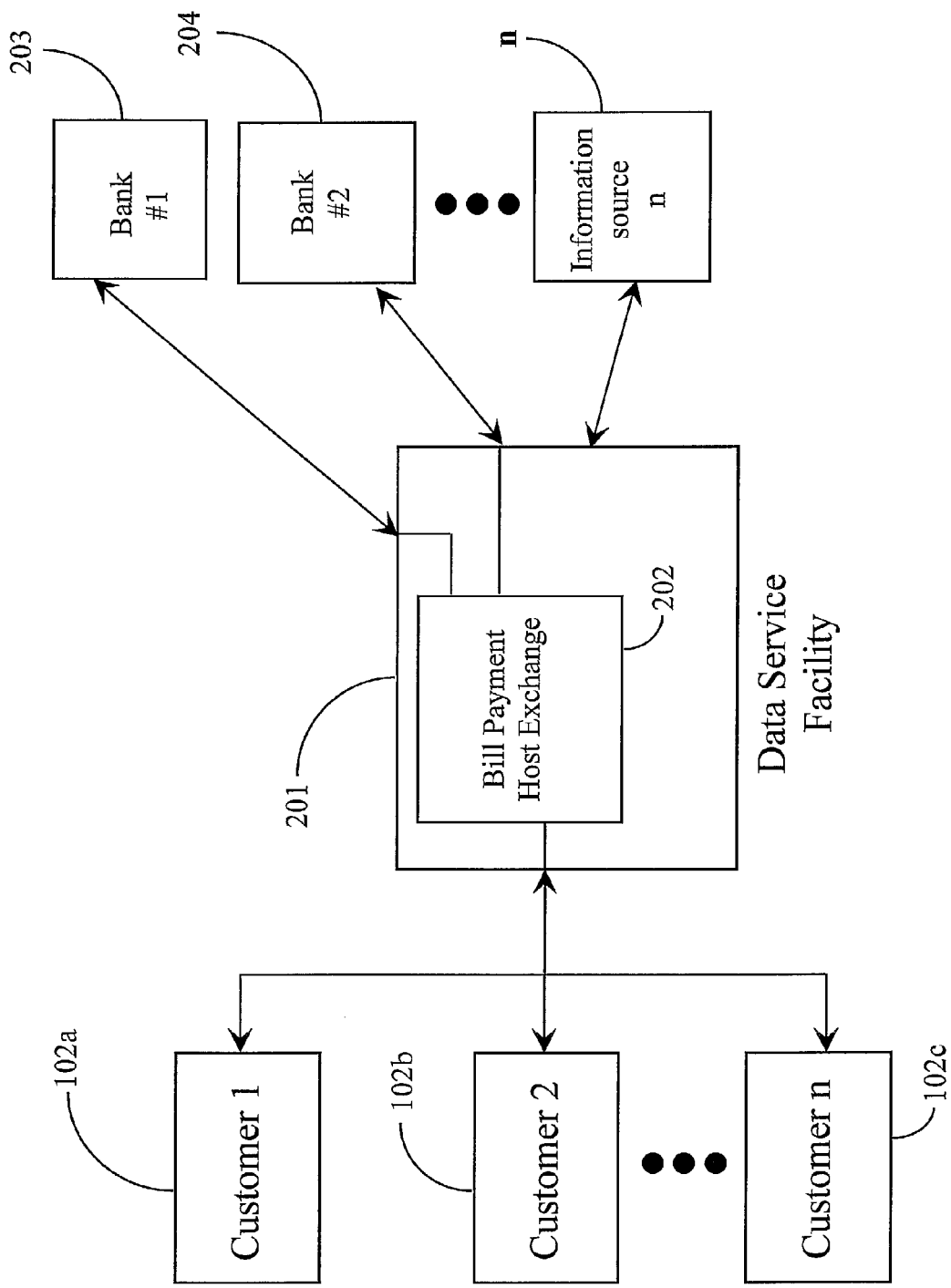
FIG. 2 is a block diagram illustrating a data transfer process according to an embodiment of the present invention.

FIG. 2 is a block diagram illustrating a data transfer process according to an embodiment of the present invention, implemented in the Yodlee-operated, Internet-connected, information collection, aggregation, and transmission facility of FIG. 1. The element number for this host facility has been changed to 201 because the functionality is different than for facility 101. Bock 105 of FIG. 1 representing the data collection, aggregation and reporting functions is not shown in FIG. 2 to avoid complexity in the drawing, but may be assumed to also be present in the system of FIG. 2. Block 202 in FIG. 2 represents functionality, including software, for providing a new and unique service to customers 1 through n, represented by element numbers 102A through 102c in FIG. 2.

In the information collection, aggregation, normalization and reporting functions of facility 101 of FIG. 1, the functionality includes intimate knowledge of the web structure of the information sources, such as banks hosting checking accounts for customers. A part of that knowledge may also be the processes and formats through which individual banks provide bill-paying services for customers. These procedures and formats typically differ from bank to bank, which is a part of the difficulty a customer faces when closing an account at one bank and opening an account at another. In embodiments of the present invention these structures may be provided to facility 101 or they may otherwise be discovered by facility 101.

In one example of the present invention customer 1 may be in the process of closing his checking account at bank #1 (203), and opening a new account at bank #2 (204). Banks #1 and #2 are banks that are also information sources familiar to service facility 201, so facility 201 has stored information regarding the processes and formats for bill paying services at each bank. The example of banks and bill pay services is a good example wherein the invention may be practiced. However, the invention may be practiced with other types of service providers and services without departing from the spirit and scope of the present invention.

Initiated by a request from Customer 1, or in some cases by information in a customer profile for Customer 1, which may provide for an automatic service, perhaps triggered by a indication of an account being exchanged from one bank to another, facility 201 through functionality 202 accesses the information for customer 1 in bank #1's bill pay service, such as all of the historical contact information for payees, all scheduled payments at the time of the exchange of accounts, and the like, and processes the information to be compatible with the bill paying services of bank #2, and then enters all of the reformatted information in the data repositories of bank #2, thereby avoiding the tedious process for the customer of re-entering all of the information at bank #2 to set up a new bill payment service.

The example described above is but one example of the present invention, which is not limited to exchanging accounts between banks, and reformatting and exchanging bill-paying service information in the exchange process. The same functionality may be applicable to, for example, securities firms providing services over the Internet for customers, who may also be customers of facility 101/201. A customer exchanging an account from one firm to another, rather than setting up buy and sell orders and other instructions, for a new firm, may have that information reprocessed and entered to the new firm for the customer, in the procedure and format required by the new firm. The invention in other embodiments may be applicable to savings and loan company transfers and exchanges, mortgage exchanges and refinances, and in general to any situation where a customer of the facility 101/201 is also a customer of other enterprises known to facility 101/201, and the enterprise the customer may be leaving provides any sort of service which is pre-configured to provide future action.

Figure 3:
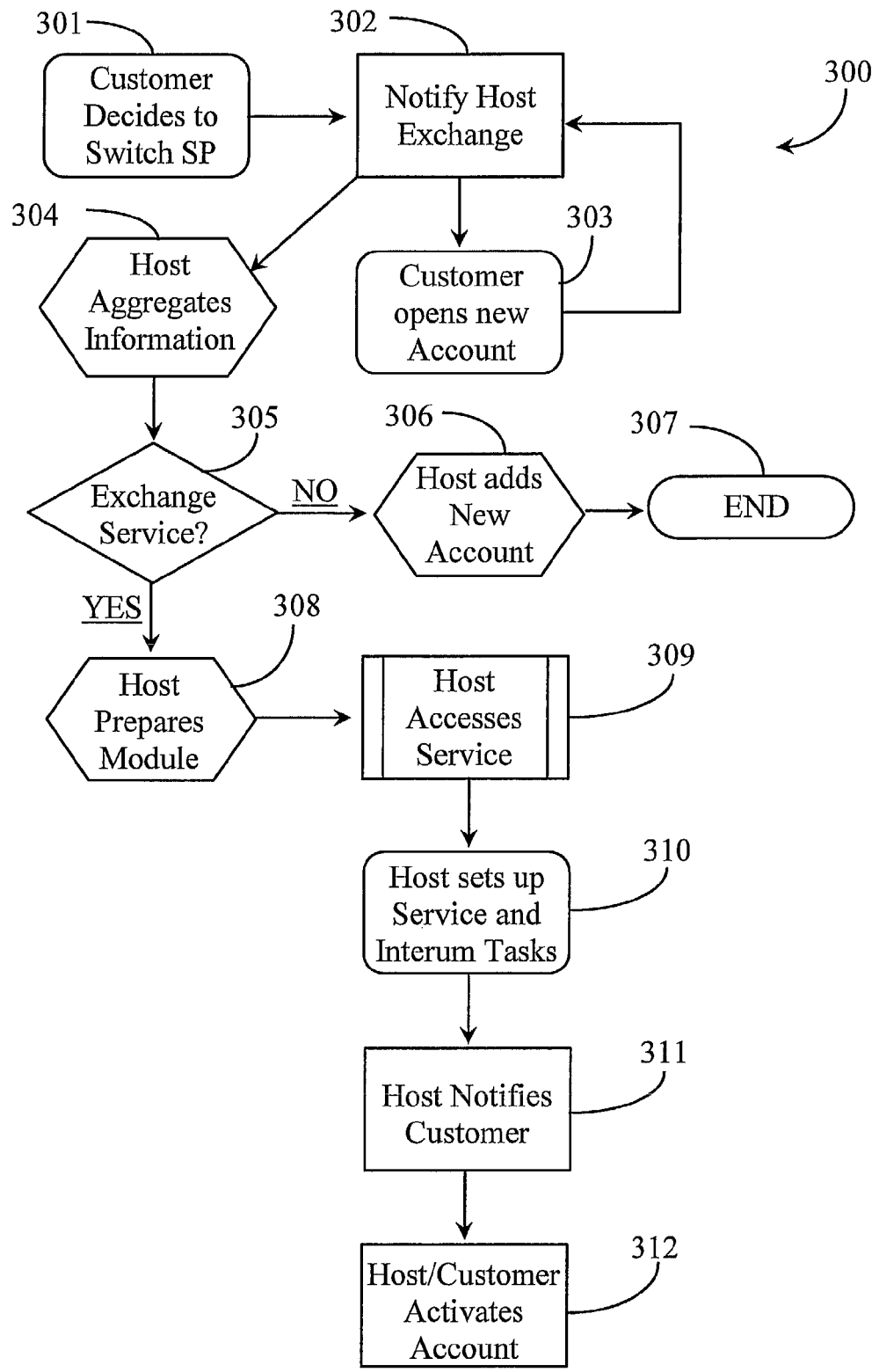
FIG. 3 is a process flow chart illustrating steps for practicing the invention.

FIG. 3 is a process flow chart illustrating steps 300 for practicing the invention. In step 301, a customer makes a decision to switch service providers (SP), which in the present example may be banking service providers. In the present example, the customer has an existing account with the first or original bank. The customer also has an account with the information aggregation and summary service that hosts the exchange service of the present invention. In this case, the information service analogous to facility 101 of FIG. 1 aided by functionality 105 of FIG. 1 has direct or indirect information about the customer account with the original bank. In the case of direct information, the information aggregator may have served as a proxy enabling the customer to perform banking tasks at the network access point of the information facility without requiring the customer to log-in to the customer access system provided by the bank. Also in this case, the information aggregator has the capability of logging into the bank system representing the customer including knowledge of all of the customer's activities at the bank.

At step 302, the customer notifies the host exchange service at the information aggregation facility of the move from the original service provider to a new service provider. In one embodiment, the information aggregation and summarization facility providing host exchange services may indirectly discover the planned switch from bank 1 to bank 2. Such a discovery might be made through the course of the normal business of aggregating and summarizing information for that customer. At step 303, the customer opens a new account at the new service provider (bank) in this example.

The scope of services the customer engaged in with the first bank may be minimally the maintenance of at least one debit account like a checking account. Additionally, other services might be involved in the switch like bill pay services the bank provided to the customer, among other investment and/or financial services. In one embodiment and logically speaking, the customer may have a design for continuing the same types of value added services like bill payment services at the new bank presuming those services are offered at the new bank.

Typically, when the customer opens the new account, the host exchange service provider is notified (302) and the customer might supply password information to the host exchange service and an account number if required. It is noted herein the information aggregation and summary service provider is the same provider of host exchange services, at least in this example. In one embodiment, the new banking service provider is already known to the host exchange system, albeit not directly through the particular customer providing notification of the new account, but through other customers that regularly bank there and are also customers of the information aggregation and summary service where the new bank is registered to that service. Therefore, the host exchange system already has information gathered about the bank, its services, the format used by the bank in billing and in other transactions, and the web structure or architecture used by the bank to provide it's network services. In one embodiment, if the new bank service is not already known to the host exchange service provider, the necessary information may be gathered by the service partly through customer-provided information and partly through other data mining capabilities including screen scraping.

In this embodiment, it is assumed that the new banking service provider is well known to the host exchange service provider. At step 304, the host exchange service provider begins collecting and aggregating data necessary to bring about a seamless transfer of services from the first bank to the second bank on behalf of the customer. A service exchange might be an exchange of one or more similar account services like a savings and checking account. In this example, the process deals with a more complicated bill payment service, but may also include set-up of certain new other services as well.

In step 304, the host may obtain all of the customer information data related to the old service account that will be closed at the old bank like full name, billing address, account transaction history, bill pay payee information, bill pay schedule information, and any information related to pending fees, pending transactions, and other current bank service information. The information retrieved may include payment schedules for each payee whether recurring payments or one-time payments.

The host exchange service provider already has information pertinent to the banks service procedures, electronic remittance forms, payer and payee forms, log-in procedures, activation procedures and navigation paths required to access services.

At step 305, it is determined if the customer will use the exchange service to set up a similar service or services with the new bank that the customer has in place at the old bank. At step 305, if no then at step 306, the host exchange service may add a new account for the customer that is added based on information the customer provided. At step 307, the process may end if the customer does not plan to migrate any services.

In a preferred embodiment of the invention, the host exchange service is able to set up a new service such as a bill pay service at the customer's new bank by leveraging data from the old service at the previous bank. In a preferred embodiment, the service also mitigates the transition so that current bill payment cycles are not interrupted.

Referring now back to FIG. 3 at step 305, if the customer desires to set up bill payment services at the new bank then at step 308, the host prepares a service account module that can be executed to establish the new service. Using the information leveraged from the old service, and information known about the new service provider, the host accesses the new bill pay service offered by the new service provider at step 309. In one embodiment, login information provided by the customer to the host exchange after opening an account at the new bank in step 303 is used to access the service to register the customer for bill payment services.

At step 310, the host sets up the service and performs any interim tasks required to establish the new service including registering all of the payees and establishing the amounts and payment dates for the customer's current bills. The new bill payment service is tied to the customer's new checking account or other account that can be electronically debited to fulfill the bill pay obligations of the customer. In this regard, the host may also have the ability to mitigate the transition of services between banks from a scheduling perspective. For example, the customer may have bills that become due during the transition between service providers. Other bills may not come due until well after the new service is activated. Therefore, the host may represent (emulate) the customer at both services automatically performing tasks that enable a smooth transition between service providers.

The host may specify that certain payments be left for the old account leaving the necessary funds in the old account. The payments that will not be interrupted by the transition between accounts may be made from the customer's new banking account.

At step 311, the host may notify the customer that the new bill payment services are set-up and ready to use. In one embodiment, there may be some activation required before the bank begins the actual service. In one embodiment, the customer may confirm the new service. In another embodiment, the host may perform the activation emulating the customer. The host exchange service of the present invention may enable a customer switching bill payment services from one bank to another to greatly reduce or eliminate the tasks of manually logging on and configuring the service. The host exchange service is able to convert data formats and form protocols from the old formats and forms used at the old service to the formats and forms used at the new service. After the new service is established and running, the old service data, navigation templates, etc, can be purged from the customer's account at the host.

As described further above, the host exchange application is able to convert data formats and form protocols used by the old service into data formats and form protocols required by the new service. In some embodiments where the customer is required to perform a visual authentication such as, for example typing a series of characters viewed in a security graphic, the host exchange may notify the customer of the requirement and may enable the customer to perform the authentication by proxy.

One with skill in the art of information collection aggregation and summary services will appreciate that the method of establishing the new service or services for the customer may very somewhat dependant on generic service requirements at each institution. Likewise, the actual involvement require of the customer in establishing and activating the new service may also very somewhat without departing from the spirit and scope of the present invention.

Figure 4:
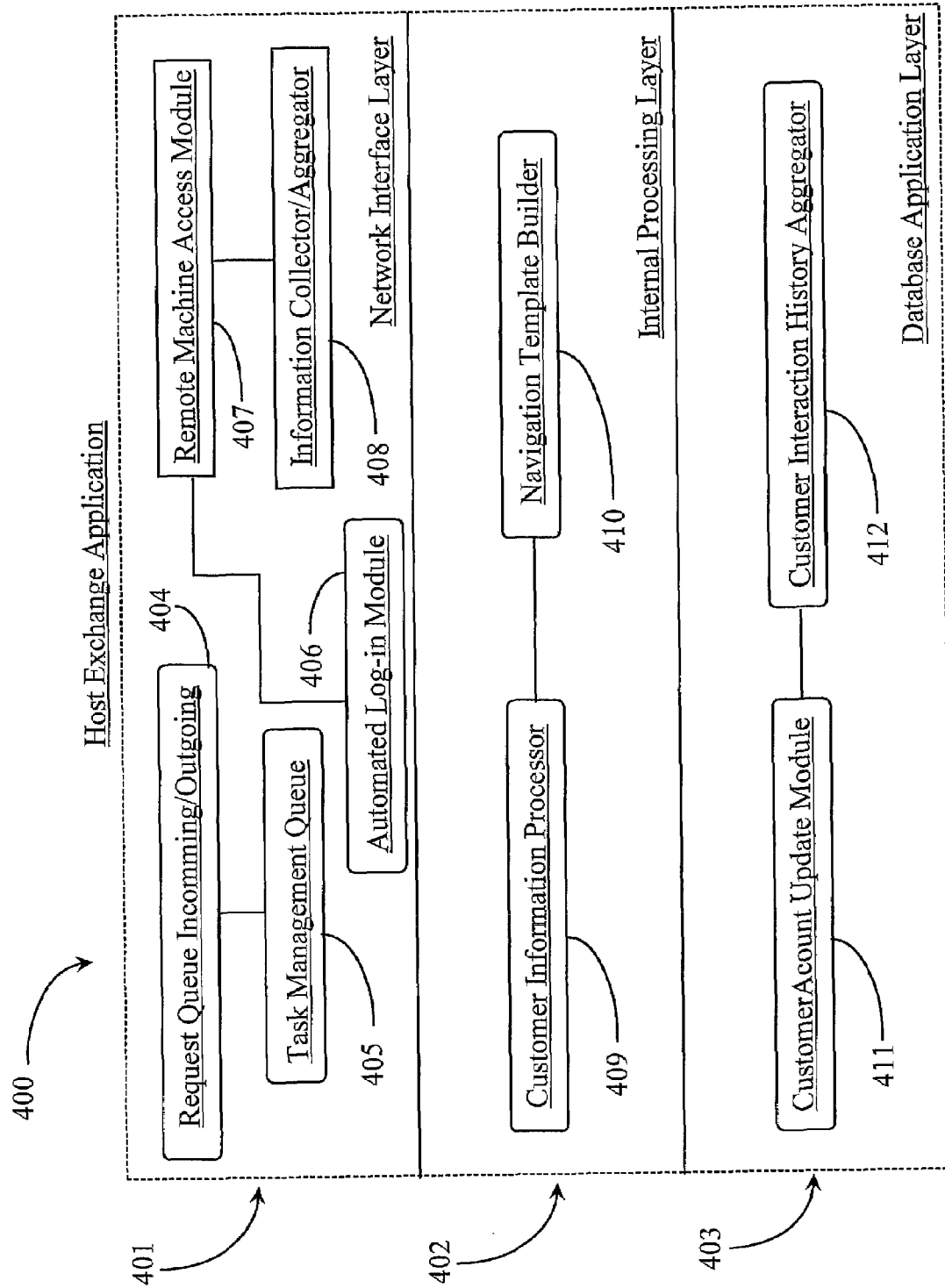
FIG. 4 is a block diagram illustrating components of a host exchange application according to an embodiment off the present invention.

FIG. 4 is a block diagram illustrating components of a host exchange application 400 according to an embodiment off the present invention. Host exchange application 400 includes, in this example, a network interfacing layer 401, an internal processing layer 402, and a database application layer 403. Network interface layer 401 is adapted to forge the actual network connections with the old and new service providers of the customer on behalf of the customer. Layer 401 has a request queue (incoming/outgoing) 404 adapted to receive customer notifications and/or requests and to queue up notifications and requests sent to customers. Layer 401 has a task management queue, in this example that is adapted to contain pending tasks that the application will perform on behalf of customers. Tasks may include registering new accounts, finalizing old accounts, and mitigating transition schedules in some embodiments (transition management).

Layer 401 includes an automated login module that may be used in conjunction with a navigation template or may be built into a navigation template in order to login to a service site or web page emulating the customer. In this example, application 401 includes a remote machine access module 407 adapted to enable the service to access certain information by permission of the customer and/or the institution in one embodiment. In other embodiments, a remote access module is not required where the information is accessible by password information known to the service.

Layer 408 includes an information collector and aggregator module 408 adapted to collect information from service providers including but not limited to data formats used, electronic form and registration orders and protocols. Information collector and aggregator 408 may also collect navigation path information, payee forms information (bill payment services), and other more generic information that the host needs to operate successfully at the service provider sites patronized by the customers.

Layer 402 is adapted to process data internally and to produce executable instances of navigation and task performance modules that are used to perform tasks for the customer. Layer 402 includes a customer information processor 409 adapted in this embodiment to process data related to the customer's old service that is being closed, including processing of other customer data as required like account history, bill payment transaction history including transaction amounts, transaction dates, and payee data.

Layer 402 may include a navigation template builder 410 that is adapted to build navigation templates for navigating to customer services and for performing tasks at those sites supporting those services. In one embodiment, navigation templates are built from scratch in the case that a provider is new to the host exchange service. In other cases, the basic templates may already exist for navigation and task performance whereby the customer information applied to those templates is the only variable.

Layer 403 is adapted to interface with the data stores of the host including those data stores that hold any information about the customer and any services the customer may currently have registered with the host such as may be the case with other data aggregation and summary services. Layer 403 includes an account update module 411 adapted to update customer account information with any new data that becomes available.

Layer 412 may also include a customer interaction history aggregator 412 that is adapted to aggregate specific customer interaction histories known to the host or that have become available to the host via login to a service provider registered with the host as a customer service provider of a customer. For example, payees of a bill payment service may maintain payment histories of payments made to them over time by the customer. Such histories may be included in information collected by the host exchange service relative to a first service provider's bill payment service. Layers 401, 402, and 403 work in integrated fashion to bring about successful transition of a service type form one service provider to another for a customer that has authorized and desires the transition.

As described further above, it is possible that the customer has not notified the host exchange service of the invention that the customer is about to change service providers. In such as case, the host exchange service may "discover" that a customer may be making a service provider change through normal services performed for the customer related to the first service provider already registered with the data aggregation and summary services. For example, a transaction history for a customer checking account at the original service provider may indicate a transaction related to closing out an account and/or opening a new account at a new service provider. The host exchange may be aware that the customer uses bill payment services provided by the first service provider and that a similar service is available at the second service provider the customer is switching to.

Whether the customer has made a decision to continue bill payment services at the new provider may not be known, however, in one embodiment, the host exchange service may pre-aggregate much of the required data to transition services and then build an interactive module that contains an offer to transition between the similar services. The module can be presented within the customer's personalized information summary page, perhaps in the financial information section of the customer's personalized summary page. A generic message or pitch might be presented such as "If you are switching services, let us help". "Click here to learn more."

The new service provider may already be well known to the host through other customers that have registered the service with the host, or through tangential data aggregation and summary services performed by the host entity relative to the new provider. For example, both Bank of America and Wells Fargo Bank may be well known to the host exchange service.

Therefore a customer switching from one to the other, where the other is the new provider, really does not have to provide much information at all that the host exchange cannot retrieve from its own data stores.

There may be more or fewer modules provided within application 400 without departing from the spirit and scope of the present invention. In one embodiment, the host exchange services are part of a larger package of services offered by a data aggregator and data summary presenter. Instances of data collector, data aggregator, and file, form, and data format converters may be available to the host exchange application but may not be an integrated piece of the application. Application 400 generally handles the transitions from one account to another and ensures all of the correct data from the first service account is seamlessly transferred to the new account.

One with skill in the art will recognize that the methods and apparatus of the present invention are not limited to bill payment services per say, but may apply to many other service types. Services that are provided more or less in a similar way by different service providers are good examples of services that the host exchange system can mitigate transition of for a customer. For example, Internet service providers offering network access services to customers represent the type of service providers subject to moderate or even frequent customer transition. Mobile telephone service providers also see a high rate of customer transition.

In different applications, the host exchange service can be used to transition banking account or investment account services, email account services, bill payment services, and other services that can be established accessed over the network.

It will be apparent to a person with skill in the art that many alterations may be made in the descriptions of embodiments above within the spirit and scope of the present invention. Software, for example, may be implemented in many different ways to accomplish essentially the same functionality. Therefore the invention is limited only by the scope of the claims that follow.

What is claimed is:

1. An account exchange system comprising:
   a computerized data aggregation and summary service for gathering and aggregating data for a subscriber from a plurality of financial institutions;
   account exchange software operating on a server coupled to the data aggregation service; and
   an interactive solicitation module;
   wherein, in the process of performing the data and aggregation service for the subscriber the interactive solicitation module discovers via the subscribers transaction history at the financial institutions that the subscriber has initiated a transaction to close an account at a first financial institution and open a new account at a second financial institution and solicits the subscriber to further subscribe to an additional service for assisting the subscriber with the task of switching service accounts and account data between the accounts and when the subscriber accepts the new service initiated by the subscriber, the account exchange software causes an account to be terminated at the first financial institution and a new account to be opened at the second financial institution, using data from the first financial institution, and processing the data to be compatible with data requirements at the second financial institution, wherein at least one service at the second financial institution is discovered and offered to the subscriber by an entity hosting the system.

2. The system of claim 1 wherein bill payment services are configured for the subscriber at the second financial institution using data from a bill payment service at the first financial institution.

3. The system of claim 1 wherein data is accessed and transferred over the Internet network.

4. The system of claim 1 wherein the account is one of a checking or a savings account.

5. The system of claim 1 wherein the financial institutions are commercial banks.

6. The system of claim 2 wherein the data includes information about payees registered by the subscriber at the first financial institution.

7. The system of claim 6 wherein the payee information includes subscriber data at the payee site including though not limited to account number, remittance address, and user authentication data.

8. The system of claim 2 wherein the data includes payment schedules for each payee whether recurring payments or one-time payments.

9. The system of claim 2 wherein the data includes data defining e-bills presented by any of the payees to the customer, the data including form structure and format.

10. The system of claim 2 wherein the data includes data describing presentment protocols for any of the payees of the customer.

11. The system of claim 2 wherein the data includes data describing the payment histories of the customer relative to any or all of the payees of the customer.

12. A method for performing account transition by a data aggregation and summary service, comprising the steps of:
   a) providing a computerized data aggregation and summary service for gathering and aggregating data for a subscriber from a plurality of financial institutions;
   b) discovering in the process of performing the data and aggregation service for the subscriber that the subscriber has initiated a transaction to close an account at a first financial institution and open a new account at a second financial institution;
   c) soliciting the subscriber to further subscribe to an additional service at the data aggregation and summary service for assisting the subscriber with the task of switching account data between the accounts;
   d) accepting the new service by the subscriber and initiating the actions of gathering data from the first financial institution by the data aggregation service causing, by account exchange software operating on a server coupled to the data aggregation service, a new account to be opened at the second financial institution, using data from the first financial institution, the data processed by the software to be compatible with data requirements at the second financial institution, wherein at least one service at the second financial institution is discovered by the system and offered to the subscriber by an entity hosting the system.

13. The method of claim 12 wherein bill payment services are configured for the subscriber at the second financial institution using data from a bill payment service at the first financial institution.

14. The method of claim 12 wherein data is accessed and transferred over the Internet network.

15. The method of claim 12 wherein the account is one of a checking or a savings account.

16. The method of claim 12 wherein the financial institutions are commercial banks.

17. The method of claim 13 wherein the data includes information about payees registered by the subscriber at the first financial institution.

18. The method of claim 17 wherein the payee information includes subscriber data at the payee site including though not limited to account number, remittance address, and user authentication data.

19. The method of claim 13 wherein the data includes payment schedules for each payee whether recurring payments or one-time payments.

20. The method of claim 13 wherein the data includes data defining e-bills presented by any of the payees to the customer, the data including form structure and format.

21. The method of claim 13 wherein the data includes data describing presentment protocols for any of the payees of the customer.

22. The method of claim 13 wherein the data includes data describing the payment histories of the customer relative to any or all of the payees of the customer.

* * * * *